United States Patent
Dudar (10) Patent No.: US 11,261,809 B2
(45) Date of Patent: Mar. 1, 2022

(54) METHODS AND SYSTEMS FOR REGENERATING A PARTICULATE FILTER

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 582 days.

(21) Appl. No.: 16/017,859

(22) Filed: Jun. 25, 2018

(65) Prior Publication Data
US 2019/0390620 A1 Dec. 26, 2019

(51) Int. Cl.
| F02D 29/02 | (2006.01) |
| F02D 29/06 | (2006.01) |
| F02D 41/02 | (2006.01) |
| F02P 5/04 | (2006.01) |
| F02D 41/14 | (2006.01) |
| G07C 5/08 | (2006.01) |

(52) U.S. Cl.
CPC ....... F02D 41/027 (2013.01); F02D 41/1454 (2013.01); F02P 5/045 (2013.01); G07C 5/085 (2013.01); F02D 2200/1002 (2013.01); F02D 2200/50 (2013.01); F02D 2200/602 (2013.01); Y10S 903/903 (2013.01)

(58) Field of Classification Search
CPC ............. F02D 41/027; F02D 2200/602; F02D 2200/50; F02D 2200/1002; F02D 41/1454; Y10S 903/903; G07C 5/085; F02P 5/045
See application file for complete search history.

(56) References Cited

U.S. PATENT DOCUMENTS

| 8,328,687 | B2 | 12/2012 | Gibson et al. | |
|---|---|---|---|---|
| 8,438,841 | B2 | 5/2013 | Bidner et al. | |
| 9,726,058 | B2 | 8/2017 | Chanko et al. | |
| 9,822,720 | B2 | 11/2017 | Bott et al. | |
| 9,957,865 | B2 | 5/2018 | Ma | |
| 2010/0043404 | A1* | 2/2010 | Hebbale | F02D 41/021 60/286 |
| 2010/0280678 | A1* | 11/2010 | Tate, Jr. | B60L 53/67 700/297 |
| 2011/0072791 | A1* | 3/2011 | Bidner | F01N 13/009 60/278 |
| 2015/0298688 | A1* | 10/2015 | Teraya | B60L 53/65 701/22 |
| 2020/0182118 | A1* | 6/2020 | Yokoi | B60K 6/48 |

OTHER PUBLICATIONS

Grayson, W., "Ford to Build a Hybrid F-150 with Integrated Generator for Jobsites," Equipment World Website, Available Online at https://www.equipmentworld.com/two-bridge-replacements-cornplete-at-rondout-reservoir-in-ny-2/Jan. 3, 2017, 3 pages.

* cited by examiner

*Primary Examiner* — Mathew Franklin Gordon
(74) *Attorney, Agent, or Firm* — David Kelley; McCoy Russell LLP (57) ABSTRACT

Systems and methods for improving regeneration of a particulate filter located in an exhaust system of a vehicle are presented. In one example, the particulate filter is regenerated when the vehicle is expected to operate in a stationary electric power generating mode where the vehicle supplies electric power to off-board electric power consumers.

19 Claims, 5 Drawing Sheets

METHODS AND SYSTEMS FOR REGENERATING A PARTICULATE FILTER

FIELD

The present description relates to a system and methods for regenerating a particulate filter that stores carbonaceous soot produced during combustion within an engine. The methods may be particularly useful for vehicles that have capacity to generate electrical power for electrical consumers that are external to a vehicle.

BACKGROUND AND SUMMARY

Gasoline engines and diesel engines may produce carbonaceous soot during some operating conditions. The soot may be stored in a particulate filter that is included in an exhaust system that is coupled to the engine. After an amount of soot stored in the particulate filter exceeds a threshold, the carbonaceous soot may be combusted within the particulate filter, which may be referred to as particulate filter regeneration. Exhaust flow through the particulate filter may improve after the particulate filter is regenerated, thereby reducing exhaust system backpressure and improving engine efficiency. For gasoline powered engines, the particulate filter may be regenerated by operating the gasoline engine with a lean air fuel mixture. The lean air-fuel mixture may provide excess oxygen to the particulate filter so that the carbonaceous soot may be combusted when the particulate filter reaches a threshold temperature. However, if the vehicle's human driver is requesting a high engine load during particulate filter regeneration, the engine may misfire and engine power output may be reduced. Therefore, it may be desirable to selectively regenerate a particulate filter during conditions when regenerating the particulate filter is less likely to result in an engine misfire. As such, there may be fewer opportunities to regenerate a particulate filter and the engine may become less efficient when the particulate filter is loaded with soot.

The inventor herein has recognized the above-mentioned disadvantages and has developed a method of operating a vehicle, comprising: regenerating a particulate filter including operating an engine with a lean air-fuel ratio and retarded spark timing via a controller when a transmission shifter is locked in a park position, the transmission shifter locked in the park position when the vehicle is operating in a stationary electrical power generating mode.

By providing regeneration of a particulate filter when a vehicle is operating in a stationary electrical power generating mode, it may be possible to reduce the possibility of an engine misfiring during particulate filter regeneration. For example, a vehicle may generate a threshold amount of electrical power via an engine rotating an electric machine. Because the engine has capacity to output power that is significantly greater than an amount of electrical power that may be generated by the electric machine, the engine may be operated at a low engine load when the vehicle is operating in the stationary electrical power generating mode. Operating the engine at a low load may allow the engine to operate with a lean air-fuel ratio to facilitate particulate filter regeneration without the engine misfiring since engine output power may be limited in the stationary electrical power generating mode.

The present description may provide several advantages. Specifically, the approach may improve particulate filter regeneration. Further, the approach may reduce the possibility of engine misfires. Further still, the approach may improve vehicle drivability since engine torque may not be reduced by operating the engine lean to regenerate a particulate filter.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
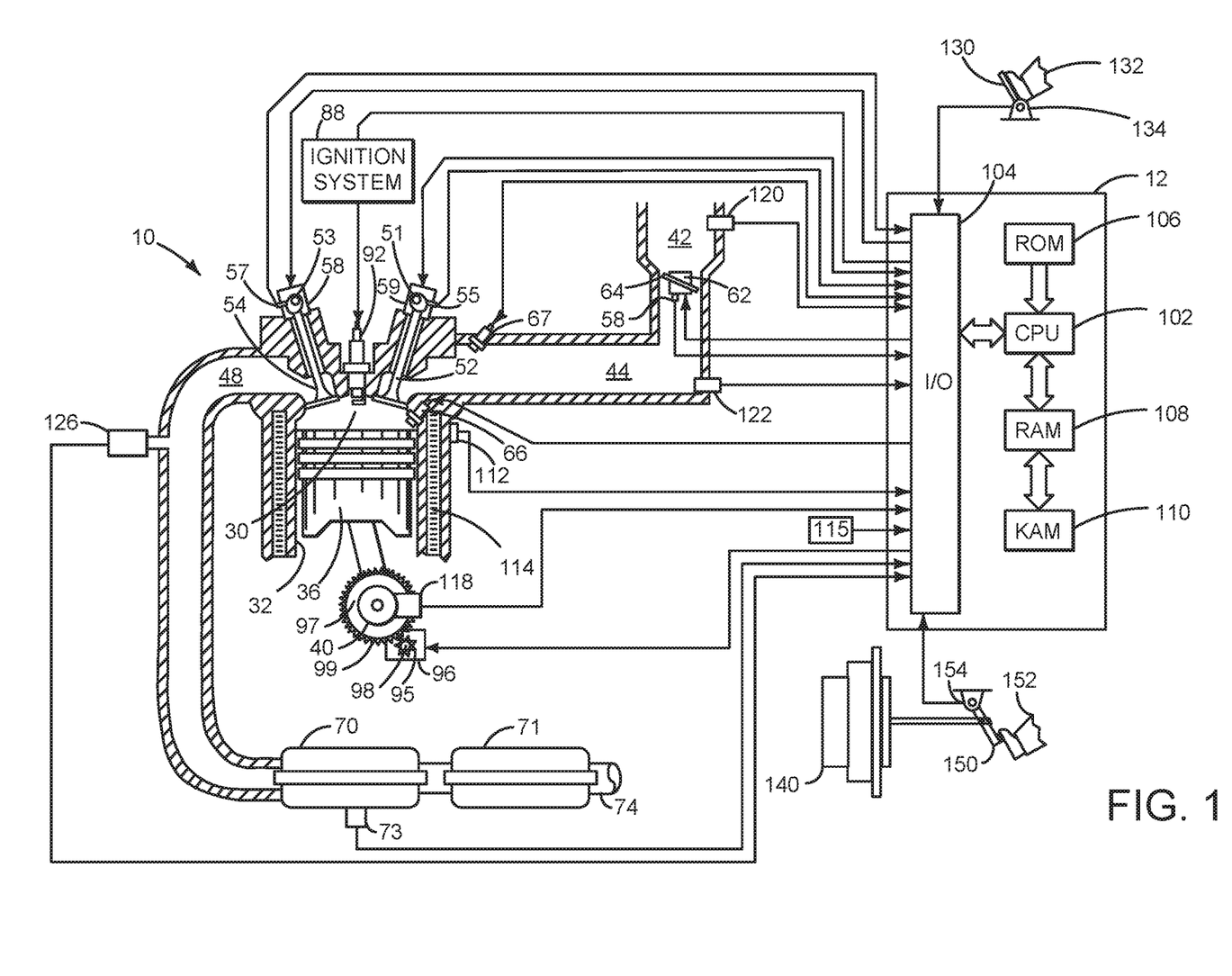
FIG. 1 is a schematic diagram of an engine.
Figure 2:
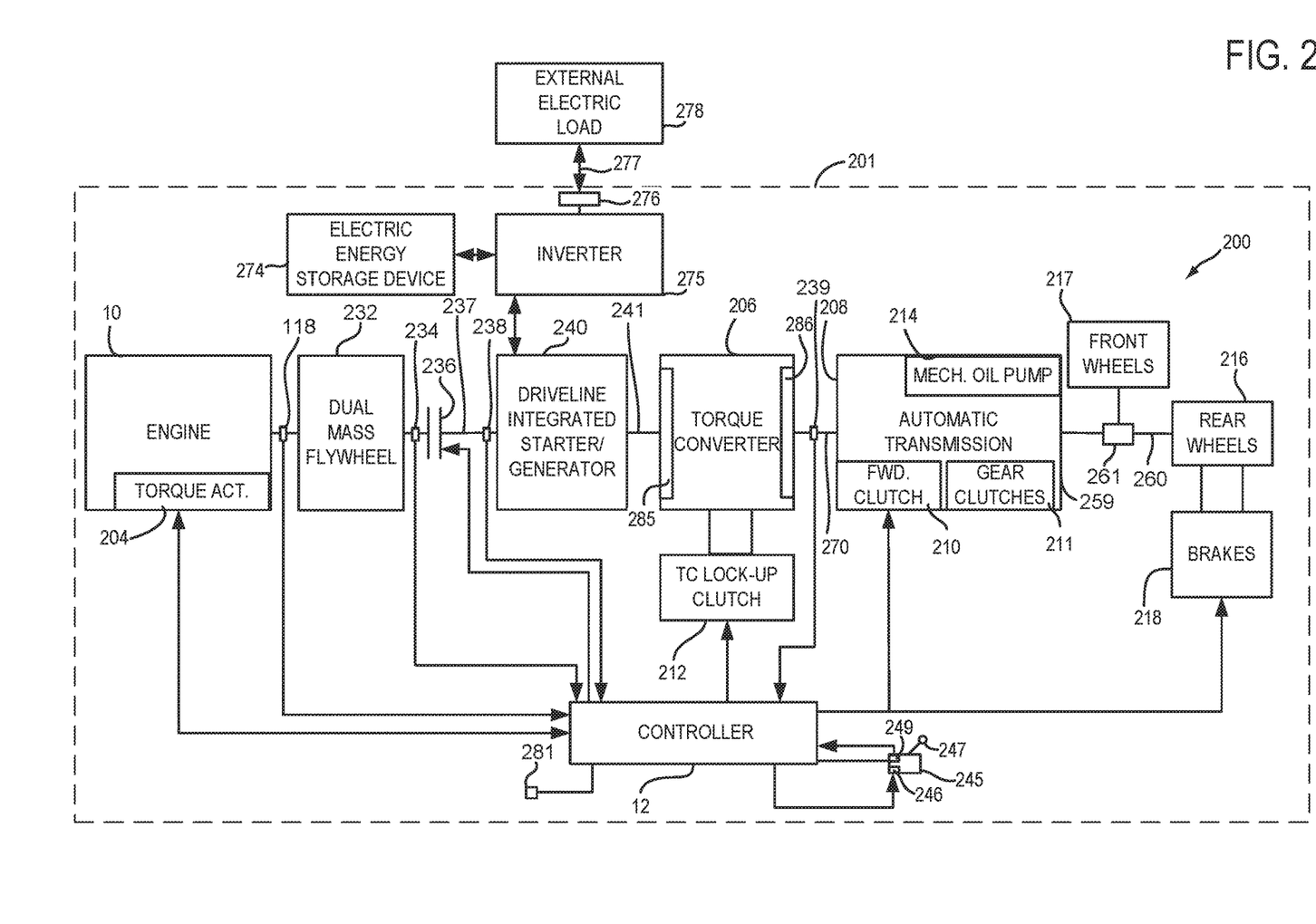
FIG. 2 is shows a first example vehicle driveline configuration.
Figure 3:
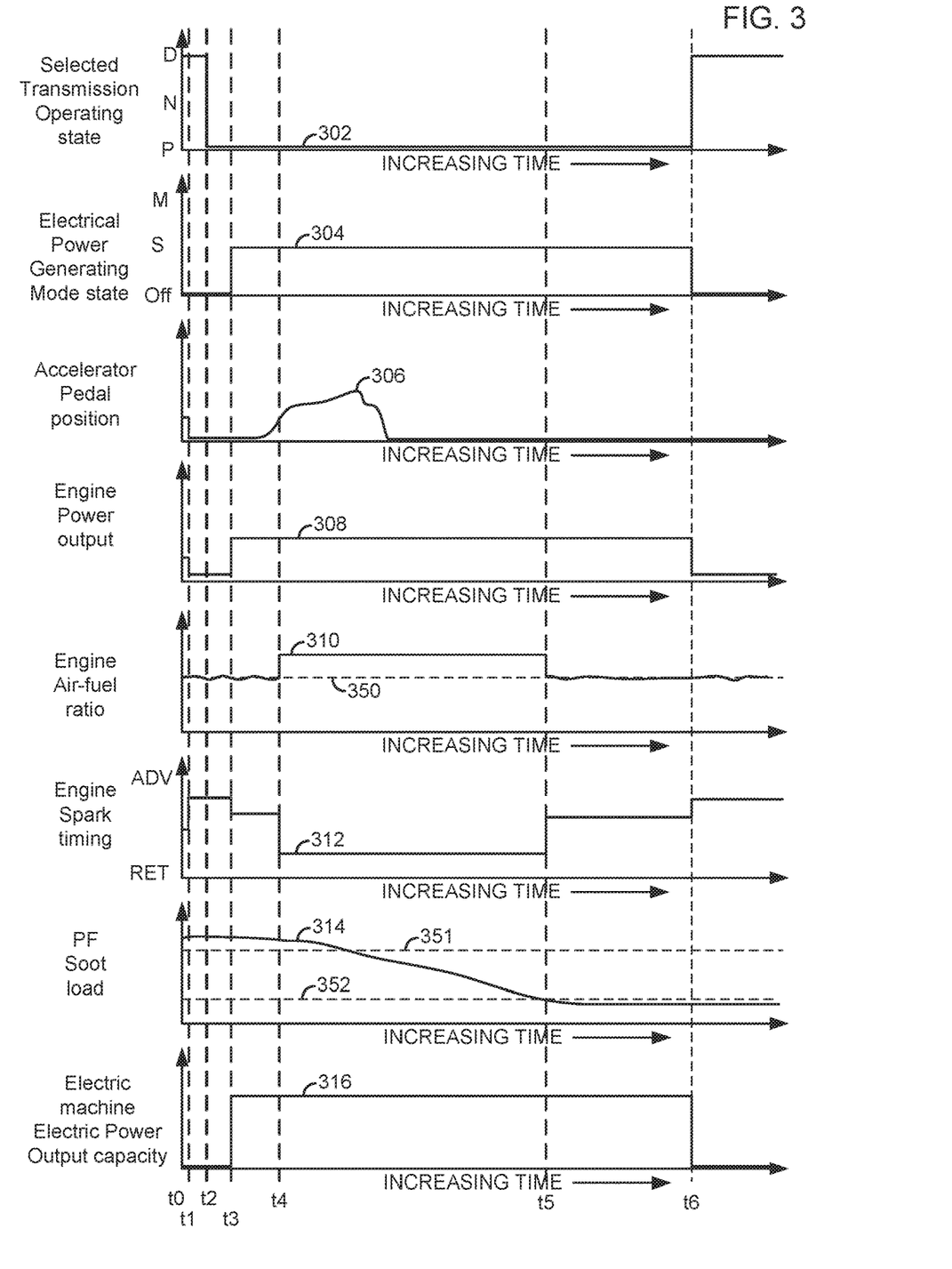
FIG. 3 is shows an example vehicle operating sequence according to the present description.

The present description is related to controlling a driveline of a vehicle that may generate electric power for electrical power consumers that are located off-board of a vehicle. The vehicle may include an engine and electric machine as shown in FIGS. 1 and 2. The engine may be operated with or without a driveline integrated starter/generator (DISG) during vehicle operation. The driveline integrated starter/generator is integrated into the driveline on the same axis as the engine crankshaft and it rotates whenever the torque converter impeller rotates. Alternatively, the engine may be coupled to the electric machine via a planetary gear set or other device. Further, the DISG may supply electric power to electric consumers that are off-board of the vehicle. The DISG is an integral part of the driveline, and the DISG may be operated with or without operating the engine. FIG. 3 shows an example vehicle operating sequence according to the method of FIG. 4. The vehicle driveline may be operated according to the method shown in FIG. 4. The vehicle may include a transmission shifter as shown in FIG. 5.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1 and 2 and employs the actuators shown in FIGS. 1 and 2 to adjust engine and powertrain or driveline operation based on the received signals and instructions stored in memory of controller 12.

Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Exhaust valve 54 may be selectively activated (e.g., allowed to move open and close during a cylinder cycle) and deactivated (e.g., held in a closed position for an entire engine cycle) via valve deactivation mechanism 58. Likewise, intake valve 52 may be selectively activated (e.g., allowed to move open and close during a cylinder cycle) and deactivated (e.g., held in a closed position for an entire engine cycle) via valve deactivation mechanism 59. Valve deactivation mechanisms similar to devices 58 and 59 may be included in other engine cylinders (not shown) so that engine 10 may operate with its full complement of engine cylinders or only a fraction of engine cylinders. For example, if engine 10 is an eight cylinder engine, two cylinders may be deactivated while four cylinders are activated to conserve fuel. Similarly, if engine 10 is a four cylinder engine, two engine cylinders may be selectively deactivated to conserve fuel.

Direct fuel injector 66 is shown positioned to inject fuel directly into cylinder 30, which is known to those skilled in the art as direct injection. Alternatively or in addition, fuel may be injected to an intake port via port fuel injector 67, which is known to those skilled in the art as port injection. Fuel injectors 66 and 67 deliver liquid fuel in proportion to the pulse width of a signal from controller 12. Fuel is delivered to fuel injectors 66 and 67 by a fuel system (not shown) including a fuel tank, fuel pump, and fuel rail (not shown).

Intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of particulate filter 70. Alternatively, a two-state exhaust gas oxygen sensor may be substituted for UEGO sensor 126.

Vehicle wheel brakes or regenerative braking via a DISG may be provided when brake pedal 150 is applied via human foot 152. Brake pedal sensor 154 supplies a signal indicative of brake pedal position to controller 12. Foot 152 is assisted by brake booster 140 applying vehicle brakes.

Particulate filter 70 may include a cordierite substrate and the substrate may include a coating comprising platinum, palladium, or other known coating. Particulate filter 70 may be positioned upstream of three way catalyst 71 according to the direction of exhaust flow from engine 10 to tailpipe 74. Particulate filter 70 and three way catalyst 71 may include multiple catalyst bricks, in one example. An estimate of carbonaceous soot loading of particulate filter 70 may be determined via differential pressure sensor 73.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Human/machine interface 115 allows a human to select the various vehicle operating modes such as stationary electric power generation mode, mobile electric power generation mode, and bypass of stationary electric power generation mode. In addition, human/machine interface 115 may display vehicle status information to human vehicle occupants.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Engine torque may be adjusted via adjusting a position of an engine torque actuator (e.g., throttle, fuel injector, camshaft, ignition system). Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 (also referred to as an electric machine) may be operated to provide torque to driveline 200, or to convert driveline torque into electrical energy to be stored in electric energy storage device 274, or to provide electrical power to off-board (e.g., external to vehicle 201) electrical power consumers 278 (e.g., saws, entertainment systems, compressors, cooking devices, refrigerators, etc.). DISG 240 has a higher output power capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 274 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. DISG 240 may receive electrical power from inverter 275 and electric energy storage device 274 when DISG 240 is operating as a motor. DISG 240 may supply electrical power to inverter 275 and off-board electrical power consumers 278 when DISG 240 is operating as a generator. Inverter 275 delivers electrical power to receptacle 276 and cable or power chord 277 electrically couples off-board electrical power consumers 278 to receptacle 276. In one example, inverter 275 is a full sine wave inverter that supplies alternating current to off-board electrical power consumers 278. Inverter 275 may also convert direct current from electric energy storage device 274 into alternating current to operate DISG 240.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art. Controller 12 also receives driving surface grade input information from inclinometer 281.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch(es) to the transmission case 259 and vehicle frame as described in U.S. patent application Ser. No. 12/833,788 "METHOD FOR CONTROLLING AN ENGINE THAT MAY BE AUTOMATICALLY STOPPED" which is hereby fully incorporated by reference for all intents and purposes. A transmission clutch pressure may be varied (e.g., increased) to adjust the engagement state of a transmission clutch, and provide a desired amount of transmission torsion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted. When restart conditions are satisfied, and/or a vehicle operator wants to launch the vehicle, controller 12 may reactivate the engine by resuming cylinder combustion.

A human driver may select a transmission state (e.g., park, drive, neutral, reverse) via transmission shifter 245. Controller 12 may lock transmission shifter 245 such that the human driver may not move transmission shifter 245 to a different state than the state that the transmission shifter is locked into. Controller 12 may lock the transmission shifter via locking device 246 (e.g., a solenoid) that prevents shift lever 247 from moving from its present position or state. Shifter position sensor 249 indicates shifter position to controller 12.

Thus, the system of FIGS. 1 and 2 provides for a vehicle system, comprising: an engine; an electric machine coupled to the engine; and a controller including executable instructions stored in non-transitory memory to log date and time data to controller memory that indicates when a vehicle is operating in a stationary electrical power generating mode, log date and time data to controller memory that indicates when the vehicle is operating in a mode other than the stationary electrical power generating mode, and regenerate a particulate filter including operating the engine with a lean air-fuel ratio when a vehicle is expected to operate in a stationary electrical power generating mode for a predetermined amount of time based on the date and time data logged to controller memory that indicates when the vehicle is operating in the stationary electrical power generating mode. The vehicle system further comprises additional instructions to not adjust engine torque in response to accelerator pedal position when the vehicle is operating in the stationary electrical power generating mode. The vehicle system further comprises additional instructions to lock a transmission shifter in a park position when the vehicle is operating in the stationary electrical power generating mode.

In some examples, the vehicle system further comprises additional instructions to operate the engine with a stoichiometric air-fuel ratio when the particulate filter is not being regenerated when the vehicle is operating in the stationary electrical power generating mode. The vehicle system further comprises additional instructions to operate the engine in a first cylinder mode in response to the vehicle operating in the stationary electrical power generating mode while regenerating the particulate filter. The vehicle system further comprises additional instructions to operate the engine in a second cylinder mode in response to the vehicle operating in the stationary electrical power generating mode while not regenerating the particulate filter. The vehicle system further comprises additional instructions to retard engine spark timing in response to operating the vehicle in the stationary electrical power generating mode.

Referring now to FIG. 3, a prophetic example sequence for operating a vehicle is shown. The sequence of FIG. 3 may be provided by the method of FIG. 4 in cooperation with the system of FIGS. 1 and 2. FIG. 3 shows an example of operating a vehicle in a stationary electrical power generating mode and regenerating a particulate filter that is located in the engine's exhaust system. The vertical lines at times t0-t6 represent times of interest. All of the plots show data for a same time interval and the time of the plots is aligned.

The first plot from the top of FIG. 3 is a plot of selected transmission operating state versus time. The horizontal axis represents time and the vertical axis indicates selected transmission mode (e.g., D—drive; P—park; N—neutral). Trace 302 indicates the selected transmission state and time increases from the left side of the plot to the right side of the plot.

The second plot from the top of FIG. 3 is a plot of the vehicle's electrical power generating mode state versus time. The horizontal axis represents time and the vertical axis indicates the vehicle's electrical power generating mode (e.g., M—mobile electrical power generating mode; S—stationary electric power generating mode; Off—electrical power generation for off-board electric power consumers is not activated). Trace 305 indicates the selected vehicle's electrical power generation mode state. Time increases from the left side of the plot to the right side of the plot.

The third plot from the top of FIG. 3 is a plot of the vehicle's accelerator pedal position versus time. The horizontal axis represents time and the vertical axis indicates the vehicle's accelerator pedal position. The accelerator pedal position increases (e.g., is applied farther) in the direction of the vertical axis arrow. Trace 306 indicates the vehicle's accelerator pedal position. Time increases from the left side of the plot to the right side of the plot.

The fourth plot from the top of FIG. 3 is a plot of engine power output versus time. The horizontal axis represents time and the vertical axis indicates the engine power output. The engine power output increases in the direction of the vertical axis arrow. Trace 308 indicates the engine power output. Time increases from the left side of the plot to the right side of the plot.

The fifth plot from the top of FIG. 3 is a plot of engine air-fuel ratio versus time. The horizontal axis represents time and the vertical axis indicates the engine's air-fuel ratio. The accelerator pedal position increases (e.g., is applied farther) in the direction of the vertical axis arrow. Trace 310 indicates the engine air-fuel ratio. Time increases from the left side of the plot to the right side of the plot. Horizontal line 350 represents a level of a stoichiometric air-fuel ratio (e.g., about 14.7:1 for gasoline engines).

The sixth plot from the top of FIG. 3 is a plot of the engine spark timing versus time. The horizontal axis represents time and the vertical axis indicates the engine's spark timing. The engine spark timing advances in the direction of the vertical axis arrow. Trace 312 indicates the engine's spark timing. Time increases from the left side of the plot to the right side of the plot.

The seventh plot from the top of FIG. 3 is a plot of the particulate filter (PF) soot load versus time. The horizontal axis represents time and the vertical axis indicates the particulate filter soot load. The particulate filter soot load increases in the direction of the vertical axis arrow. Trace 314 indicates the particulate filter soot load. Time increases from the left side of the plot to the right side of the plot. Horizontal line 351 represents an upper threshold soot load. The particulate filter may be regenerated when the particulate filter soot load is greater than threshold 351. Horizontal line 352 represents a lower threshold soot load. Regeneration of the particulate filter ceases when the soot load of the particulate filter is less than threshold 352.

The eighth plot from the top of FIG. 3 is a plot of the electric power output capacity from the electric machine to an off-board electrical power consumer (e.g., an upper threshold amount of electrical power that may be provided to the off-board electrical power consumer by the electric machine). The horizontal axis represents time and the vertical axis indicates the electrical power output capacity of the electric machine to the off-board electric power consumers. The electric machine power output capacity increases in the direction of the vertical axis arrow. Trace 316 indicates the electric machine power output capacity. Time increases from the left side of the plot to the right side of the plot.

At time t0, the transmission is in drive and the vehicle is not in an electric power generating mode. The accelerator pedal input is low, but non-zero. The engine power output is low and the engine is operating with a stoichiometric air-fuel ratio. The engine spark timing is moderately advanced and the particulate filter soot load is high. The electric power output capacity to off-board electric consumers is zero.

At time t1, the transmission remains in drive and the vehicle is not in an electric power generating mode. The accelerator pedal is fully released and the engine power output is reduced so that the engine idles. The engine continues to operate with a stoichiometric air-fuel ratio and spark timing is advanced further since the engine load is reduced. The particulate filter soot load remains high and the electric power output capacity to off-board electric consumers is zero.

At time t2, the human driver shifts the transmission into park. The vehicle is still not in an electric power generating mode. The accelerator pedal is fully released and the engine power output is at a level to idle the engine. The engine continues to operate with a stoichiometric air-fuel ratio and spark timing is advanced since engine load is low. The particulate filter soot load remains high and the electric power output capacity to off-board electric consumers is zero.

At time t3, the human driver changes the vehicle mode to stationary electric power generating mode via a human/machine interface. The vehicle may output a higher level of electrical power in the stationary electric power generating mode as compared with the amount of electrical power that may be output by the vehicle during mobile electric power generating mode. The transmission shifter is locked in its park position when the vehicle is operated in stationary electric power generating mode. Further, the vehicle may not respond to changes in the position of the accelerator pedal while the vehicle is in the stationary electric power generating mode. The transmission remains in park and the transmission shifter is locked in park (not shown). The accelerator pedal is fully released and the engine power output is increased so that the electric machine electric power output capacity is increased. The engine continues to operate with a stoichiometric air-fuel ratio and spark timing is retarded a small amount since the engine load is increased. The particulate filter soot load remains high.

At time t4, regeneration of the particulate filter begins since the vehicle is expected to remain in the stationary electric power generating mode for longer than a threshold amount of time based on prior operating history of the vehicle. The engine air-fuel ratio shifts lean and spark timing is retarded to heat the particulate filter. The accelerator pedal position has increased, but the engine power output remains constant and at its previous level so as to not respond to the accelerator pedal position. The soot in the particulate filter begins to be reduced via oxidation and the electric power output by the vehicle remains constant and at its previous level.

Between time t4 and time t5, the particulate filter continues to regenerate and the particulate filter soot load decreases as the soot is oxidized. The engine air-fuel ratio remains lean and spark timing is retarded. The transmission remains in park and the vehicle remains in the stationary electric power generating mode. The accelerator pedal position is not responded to and the engine mechanical power output remains constant. The electric power output capacity of the vehicle also remains constant.

At time t5, the soot load of the particulate filter is reduced to less than threshold 352 so regeneration of the particulate filter is ceased. The engine air-fuel ratio returns to a stoichiometric level and engine spark timing is advanced to increase engine efficiency. The engine mechanical output torque remains constant and the vehicle electrical power output capacity remains at its previous level. The transmission remains in park and the vehicle remains in the stationary electrical power generating mode.

At time t6, the vehicle exits the stationary electrical power generating mode. The vehicle may exit the stationary electrical power generating mode via a human operator requesting to exit the stationary electrical power generating mode via a human/machine interface. The human driver also engages the transmission shifter into the drive position, which is allowed since the transmission gear shifter is unlocked when the vehicle exits the stationary electrical power generating mode. The engine's mechanical power output is decreased in response to exiting the stationary electrical power generating mode and the vehicle electric power output capacity is reduced to zero. The engine operates with a stoichiometric air-fuel ratio and spark timing is advanced when the engine load is decreased. The soot load of the particulate filter remains at a low level and the vehicle begins to respond to the position of the accelerator pedal (not shown).

In this way, a particulate filter may be regenerated during conditions where engine load is expected to remain relatively low when the engine is being used to generate electric power via the electric machine. The vehicle does not respond to accelerator pedal position at this time so that engine load remains below a threshold load where the possibility of engine misfire may be reduced.

Figure 4:
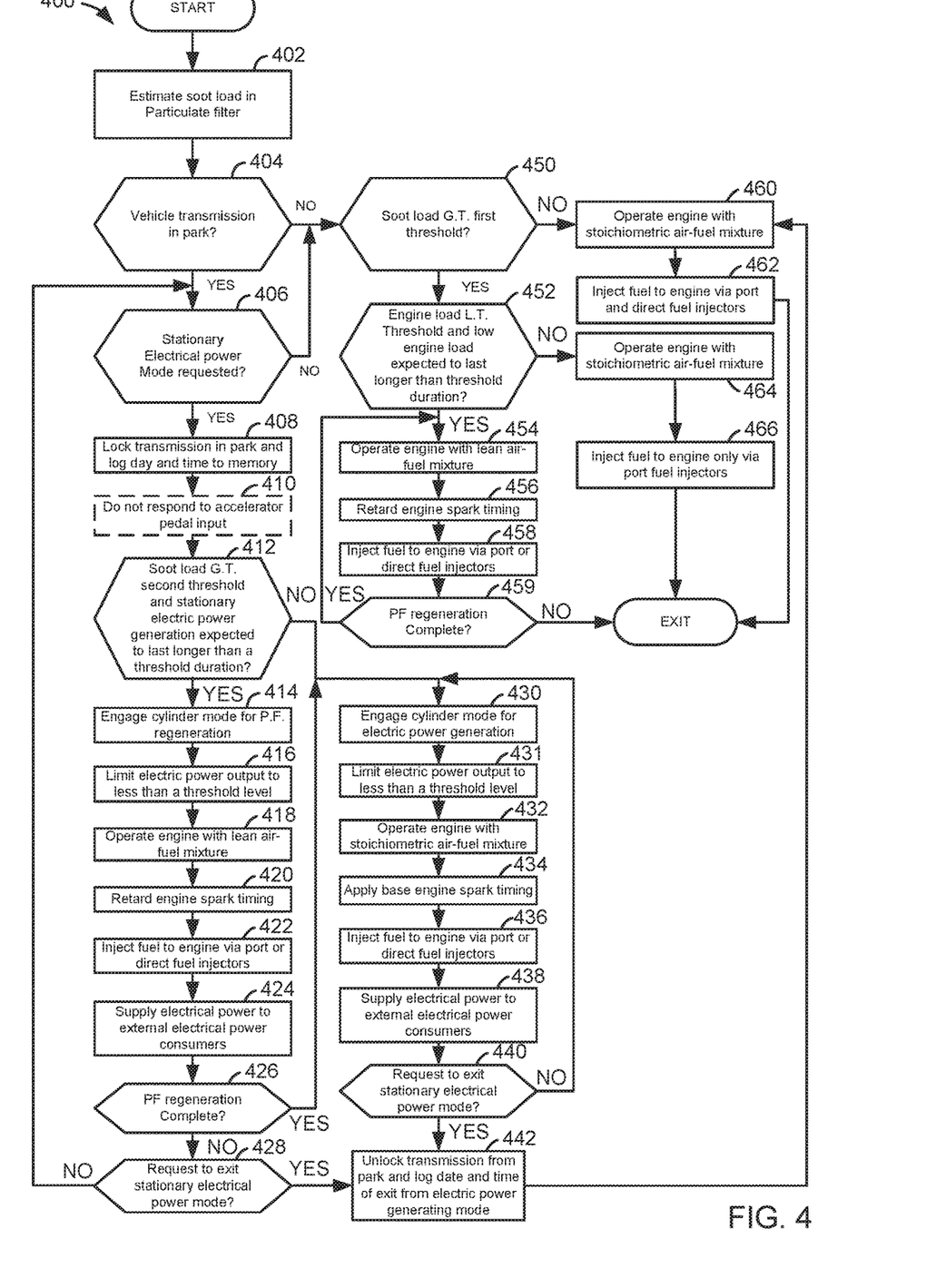
FIG. 4 is a flowchart of a method for operating a vehicle.
Figure 5:
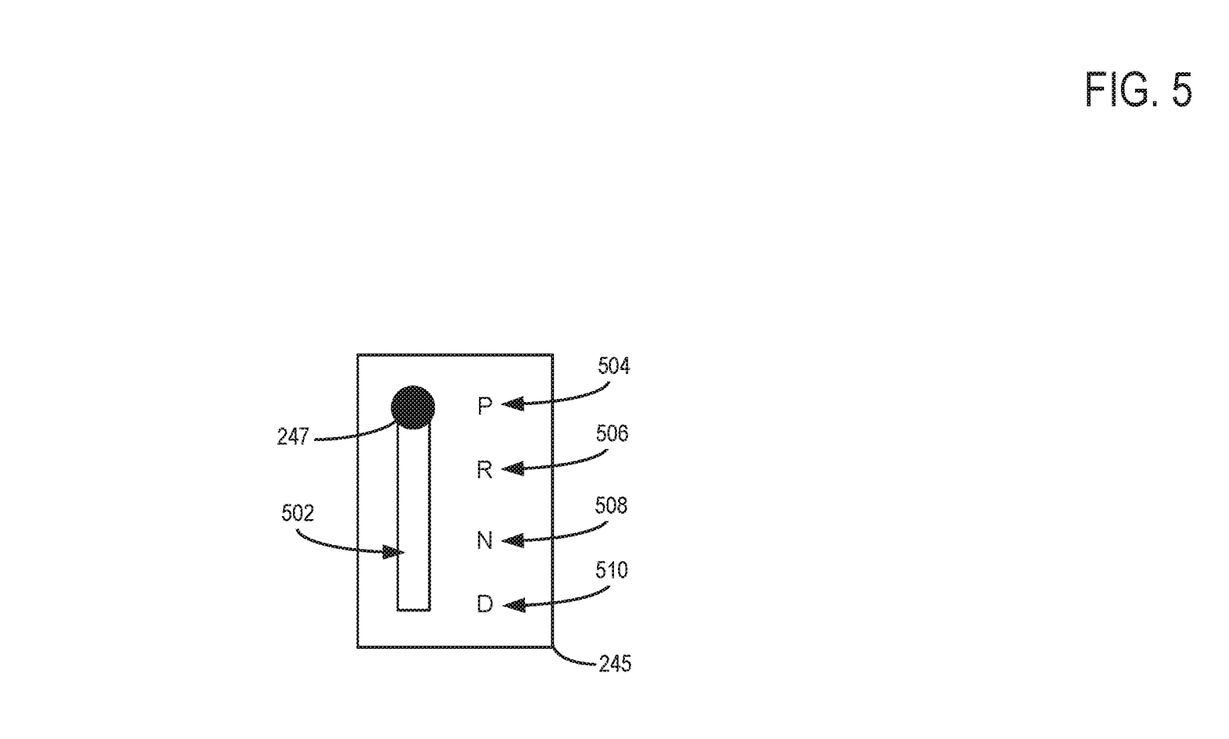
FIG. 5 is a plan view of an example transmission shifter.

Referring now to FIG. 4, a flow chart of a method for operating a vehicle driveline is shown. The method of FIG. 4 may be incorporated into and may cooperate with the system of FIGS. 1 and 2. Further, at least portions of the method of FIG. 4 may be incorporated as executable instructions stored in non-transitory memory while other portions of the method may be performed via a controller transforming operating states of devices and actuators in the physical world.

At 402, method 400 estimates a soot load of a particulate filter. In one example, method 400 estimates soot load of the particulate filter based on a pressure drop across the particulate filter when flow through the engine is a predetermined amount. The measured pressure drop is then applied to reference or index a table or function of empirically determined values. The table or function outputs an estimated soot load. The values in the table or function may be empirically determined via loading a particulate filter with a known amount of soot and measuring a pressure drop across the particulate filter when the engine operates at a particular engine speed and load. Method 400 proceeds to 404.

At 404, method 400 judges if the vehicle shifter is in a park position. The transmission's output shaft is locked in position via a parking pawl when the transmission is in park and the transmission's input shaft is decoupled from the transmissions output shaft. If method 400 judges that the transmission is in park, the answer is yes and method 400 proceeds to 406. If method 400 judges that the transmission is not in park, the answer is no and method 400 proceeds to 450.

At 406, method 400 judges if stationary electric power generation mode for the vehicle is requested. The vehicle may enter stationary electric power generation mode when the transmission is in park and stationary electric power generation mode is requested via a human/machine interface. If a request to enter stationary electric power generation mode has been made via the human/machine interface, the answer is yes and method 400 proceeds to 408. Otherwise, the answer is no and method 400 proceeds to 450.

At 408, method 400 locks the transmission shifter in a park position to enter stationary electric power generation mode. The transmission shifter may be locked in the park position via a shift locking solenoid that pins shift lever 247 in the park position. The transmission shifter may not be moved from the park position unless the vehicle exits the stationary electric power generating mode via a request input to the human/machine interface. By locking the transmission shifter, the possibility of the human driver leaving the vehicle's present position with electrical consumers attached to the vehicle may be reduced. Method 400 also logs the day (e.g., Monday, Tuesday, etc.) and time (e.g., 6 A.M.) that the vehicle enters stationary electric power generating mode to controller non-transitory memory. The day and time information may be applied to estimate how long the vehicle will remain in stationary electric power generating mode. The vehicle also begins supplying electrical power to off-board electrical energy consumers. Method 400 proceeds to 410.

At 410, method 400 optionally does not respond to changes in accelerator pedal position. For example, if the accelerator pedal is fully applied after being fully released, engine power output is not changed in response to the change in accelerator pedal position. The controller may not respond to a position of the accelerator pedal when the vehicle is in stationary electric power generation mode. Method 400 proceeds to 412.

At 412, method 400 judges if a soot load (e.g., amount of soot stored in the particulate filter) of the particulate filer is greater than a second threshold soot load. The second threshold soot load (e.g., 75% of a predetermined amount of soot stored in the particulate filter) may be empirically determined and stored in controller non-transitory memory. Method 400 determines if the soot load determined at 402 is greater than the second threshold level.

Method 400 may also judges if the vehicle is expected to operate in the stationary electric power generating mode for longer than a threshold amount of time (e.g., an amount of time that it takes to fully regenerate the particulate filter). In one example, method 400 reviews the vehicle's recent past history of logged days and times the vehicle entered stationary electric power generating mode to estimate how long the vehicle will remain in stationary electric power generating mode. For example, if for the last six weeks the vehicle has entered stationary electric power generating mode Monday-Friday from 8:00 A.M. to 11:00 A.M. and it is presently Monday morning at 8:10 A.M., then it may be expected that the vehicle will be in stationary electric power generating mode for a threshold amount of time (e.g., 10 minutes). On the other hand, if it is Saturday at 11:00 A.M. it may be expected that the vehicle will not be in the stationary electric power generating mode for a threshold amount of time.

If method 400 judges that a soot load of the particulate filer is greater than a second threshold soot load and that the vehicle is expected to operate in the stationary electric power generating mode for longer than a threshold amount of time, then the answer is yes and method 400 proceeds to 414. If not, the answer is no and method 400 proceeds to 430. The second soot load threshold amount may be less than the first threshold soot load amount described at 450 so that the particulate filter may be regenerated more frequently when the vehicle is operated in the stationary electric power generation mode. Therefore, there may be less desire to regenerate the particulate filter during driving conditions where operating the engine with a lean air-fuel mixture may result in engine misfire.

At 414, method 400 engages a specific cylinder mode for regenerating a particulate filter while the vehicle is operating in a stationary electric power generating mode. In one example, method 400 may activate six cylinders and deactivate two cylinders of an eight cylinder engine during such conditions. However, if the vehicle were operating in stationary electric power generating mode without regenerating the particulate filter, method 400 may activate four cylinders and deactivate four cylinders of the eight cylinder engine. By activating more cylinders while regenerating the particulate filter, the cylinders may be operated at a lower load where they may be less inclined to misfire.

However, during other conditions, fewer engine cylinders may be activated if the particulate filter is being regenerated. For example, if the engine is large and electric power provided by the electric machine is low, then method 400 may activate six cylinders and deactivate two cylinders of the eight cylinder engine when the particulate filter is not being regenerated. This may allow the engine to have excess power capacity in case the electric power load is increased. Further, method 400 may activate four cylinders and deactivate four cylinders of the eight cylinder engine when the particulate filter is being regenerated to increase exhaust gas temperatures of the engine so that the particulate filter may be regenerated. In one example, method 400 activates a predetermined cylinder mode (e.g., four active engine cylinders and four deactivated engine cylinders) when the particulate filter is being regenerated while the vehicle is operating in the stationary electric power generating mode. Method 400 proceeds to 416 after activating the predetermined cylinder mode.

At 416, method 400 limits electric power output to off-board electric consumers to less than a first threshold amount (e.g., 2400 Watts). In other words, the electric power output from the electric machine driven via the engine is not allowed to exceed a threshold amount of power. This may reduce the possibility of engine misfire. In one example, method 400 may limit the electric power output by the electric machine via adjusting current supplied to field windings of the electric machine. Method 400 proceeds to 418.

At 418, method 400 operates the engine with an air-fuel ratio that is lean (e.g., excess air) of stoichiometry. By operating the engine lean, more oxygen may be available in engine exhaust gases to regenerate the particulate filter. Method 400 proceeds to 420.

At 420, method 400 retards engine spark timing from its base spark timing for the present engine speed and load. For example, if base spark timing is 20 crankshaft degrees before top-dead-center for a cylinder, then spark timing may be retarded to 15 crankshaft degrees before top-dead-center for the cylinder. By retarding spark timing, exhaust gas temperature may be increased so that soot trapped within the particulate filter may begin to combust. Method 400 proceeds to 422.

At 422, method 400 injects fuel to the engine via port and/or direct fuel injectors. The injectors inject an amount of fuel that operates the engine lean as described at 418 (e.g., an air-fuel ratio of 16:1). Method 400 proceeds to 424.

At 424, method 400 supplies electric power to off-board electric power consumers. The electric power is generated via the electric machine being rotated by the engine. Method 400 proceeds to 426.

At 426, method 400 judges if particulate filter (PF) regeneration is complete. In one example, particulate filter regeneration is complete when the amount of soot stored in the particulate filter is less than a threshold amount. Method 400 may judge that less than a threshold amount of soot is stored in the particulate filter when a pressure drop across the particulate filter is less than a threshold pressure drop. If method 400 judges that particulate filter regeneration is complete, the answer is yes and method 400 proceeds to 430. Otherwise, the answer is no and method 400 proceeds to 428.

At 428, method 400 judges if there is a request to exit stationary electric power generation mode. In one example, a human may make a request to exit the stationary electric power generation mode via a human/machine interface. If method 400 judges that there is a request to exit the stationary electric power generation mode, the answer is yes and method 400 proceeds to 442. Otherwise, the answer is no and method 400 returns to 406.

At 430, method 400 engages a specific cylinder mode for not regenerating a particulate filter while the vehicle is operating in a stationary electric power generating mode. In one example, method 400 may activate four cylinders and deactivate four cylinders of an eight cylinder engine during such conditions. Method 400 proceeds to 431 after activating the predetermined cylinder mode.

At 431, method 400 limits electric power output to off-board electric consumers to less than a second threshold amount (e.g., 3600 Watts). In other words, the electric power output from the electric machine driven via the engine is not allowed to exceed the second threshold amount of power. Since the particulate filter is not regenerating and the engine air-fuel ratio is stoichiometric, there may be less possibility of engine misfire and so electrical output capacity of the electric machine may be increased to a higher level than was described at 416. In one example, method 400 may limit the electric power output by the electric machine via adjusting current supplied to field windings of the electric machine. Method 400 proceeds to 432.

At 432, method 400 operates the engine with a stoichiometric air-fuel ratio. By operating the engine with a stoichiometric air-fuel ratio, engine exhaust emissions may be reduced. Method 400 proceeds to 434.

At 434, method 400 operates the engine with base engine spark timing for the present engine speed and load. By operating the engine with base spark timing, engine efficiency may be improved. Method 400 proceeds to 436.

At 436, method 400 injects fuel to the engine via port and/or direct fuel injectors. The injectors inject an amount of fuel that operates the engine lean as described at 418 (e.g., an air-fuel ratio of 16:1). Method 400 proceeds to 438.

At 438, method 400 supplies electric power to off-board electric power consumers. The electric power is generated via the electric machine being rotated by the engine. Method 400 proceeds to 440.

At 440, method 400 judges if there is a request to exit stationary electric power generation mode. In one example, a human may make a request to exit the stationary electric power generation mode via a human/machine interface. If method 400 judges that there is a request to exit the stationary electric power generation mode, the answer is yes and method 400 proceeds to 442. Otherwise, the answer is no and method 400 returns to 430.

At 442, method 400 unlocks the transmission shifter from park and allows the transmission to be shifted out of park. Method 400 also logs the day (e.g., Monday, Tuesday, etc.) and time (e.g., 6 A.M.) that the vehicle exits the stationary electric power generating mode to controller non-transitory memory. The day and time information may be applied to estimate how long the vehicle will remain in stationary electric power generating mode. Method 400 proceeds to 460.

At 450, method 400 judges if a soot load of the particulate filer is greater than a first threshold soot load. The second threshold soot load (e.g., 85% of a predetermined amount of soot stored in the particulate filter) may be empirically determined and stored in controller non-transitory memory. The first soot load of step 450 may be greater than the second soot load of step 412 so that the particulate filter is regenerated less frequently during vehicle driving conditions so that the particulate filter may be regenerated when the vehicle is in the stationary electrical power generating mode so as to reduce the possibility of engine misfire. If method 400 judges that the soot load of the particulate filter is greater than the first threshold, the answer is yes and method 400 proceeds to 452. Otherwise, the answer is no and method 400 proceeds to 460.

At 452, method 400 judges if engine load is less than a threshold engine load and if engine load is expected to stay less than the threshold engine load. In one example, method 400 may judge whether or not engine load is expected to be less than a threshold load for more than a predetermined amount of time based on the vehicle's path of travel. For example, if the vehicle is traveling downhill for a long duration, it may be expected that engine load will be less than a threshold load for more than a predetermined amount of time. If method 400 judges that engine load is less than a threshold engine load and engine load is expected to stay less than the threshold engine load for a predetermined amount of time, the answer is yes and method 400 proceeds to 454. Otherwise, the answer is no and method 400 proceeds to 464.

At 454, method 400 operates the engine with an air-fuel ratio that is lean (e.g., excess air) of stoichiometry. By operating the engine lean, more oxygen may be available in engine exhaust gases to regenerate the particulate filter. Method 400 proceeds to 456.

At 456, method 400 retards engine spark timing from its base spark timing for the present engine speed and load. For example, if base spark timing is 20 crankshaft degrees before top-dead-center for a cylinder, then spark timing may be retarded to 15 crankshaft degrees before top-dead-center for the cylinder. By retarding spark timing, exhaust gas temperature may be increased so that soot trapped within the particulate filter may begin to combust. Method 400 proceeds to 458.

At 458, method 400 injects fuel to the engine via port and/or direct fuel injectors. The injectors inject an amount of fuel that operates the engine lean as described at 454 (e.g., an air-fuel ratio of 16:1). Method 400 proceeds to 459.

At 459, method 400 judges if particulate filter (PF) regeneration is complete. In one example, particulate filter regeneration is complete when the amount of soot stored in the particulate filter is less than a threshold amount. Method 400 may judge that less than a threshold amount of soot is stored in the particulate filter when a pressure drop across the particulate filter is less than a threshold pressure drop. If method 400 judges that particulate filter regeneration is complete, the answer is yes and method 400 proceeds to exit. Otherwise, the answer is no and method 400 returns to 454.

At 464, method 400 operates the engine with a stoichiometric air-fuel ratio. By operating the engine with a stoichiometric air-fuel ratio, engine exhaust emissions may be reduced. Method 400 proceeds to 466.

At 466, method 400 injects fuel to the engine via only port fuel injectors. Direct fuel injectors are deactivated to reduce engine soot production. The injectors inject an amount of fuel that operates the engine at a stoichiometric air-fuel ratio as described at 464. Method 400 proceeds to exit.

At 460, method 400 operates the engine with a stoichiometric air-fuel ratio. By operating the engine with a stoichiometric air-fuel ratio, engine exhaust emissions may be reduced. Method 400 proceeds to 462.

At 462, method 400 injects fuel to the engine via port and/or direct fuel injectors. The injectors inject an amount of fuel that operates the engine with a stoichiometric air-fuel ratio as described at 460. Method 400 proceeds to exit.

In this way, regeneration of a particulate filter may be performed or not performed so as to ensure that once particulate filter regeneration begins, it may complete. Further, engine misfires may be prevented by regenerating the particulate filter during engine operating conditions where engine load will not exceed a threshold load (e.g., during stationary electric power generation mode).

Thus, the method of FIG. 4 provides for a method of operating a vehicle, comprising: regenerating a particulate filter including operating an engine with a lean air-fuel ratio and retarded spark timing via a controller when a transmission shifter is locked in a park position, the transmission shifter locked in the park position when the vehicle is operating in a stationary electrical power generating mode. The method includes where the transmission shifter is prevented from moving from a park position to drive or reverse position unless a human driver overrides operation of a shift locking device, and where the shift locking device automatically engages to prevent the transmission shifter from exiting park in response to the vehicle operating in the stationary electrical power generating mode. The method further comprises delivering electrical power from an electric machine onboard the vehicle to an electrical energy consumer off-board the vehicle when the vehicle is operating in the stationary electrical generating mode.

In some examples, the method includes where the electric machine is coupled to the engine. The method further comprises operating the vehicle in the stationary electrical power generating mode. The method further comprises operating the engine with a stoichiometric air-fuel ratio when the particulate filter is not being regenerated when the vehicle is operating in the stationary electrical power generating mode. The method further comprises operating the engine in a first cylinder mode in response to the vehicle operating in the stationary electrical power generating mode while regenerating the particulate filter. The method further comprises operating the engine in a second cylinder mode in response to the vehicle operating in the stationary electrical power generating mode while not regenerating the particulate filter, where the second cylinder mode is different than the first cylinder mode.

The method of FIG. 4 also provides for a method of operating a vehicle, comprising: regenerating a particulate filter including operating an engine with a lean air-fuel ratio and retarded spark timing via a controller when a transmission shifter is locked in a park position, the transmission shifter locked in the park position when the vehicle is operating in a stationary electrical power generating mode; and not adjusting engine torque in response to accelerator pedal position when the vehicle is operating in the stationary electrical power generating mode. The method further comprises adjusting engine torque in response to accelerator pedal position when the vehicle is not operating in the stationary electrical power generating mode. The method includes where an electric machine coupled to the engine provides electric power to electric consumers off-board the vehicle when the vehicle is operating in the stationary electrical power generating mode. The method further comprises providing not more than a first threshold amount of power via the engine when the vehicle is operating in the stationary electrical power generating mode and when the particulate filter is being regenerating. The method further comprises providing not more than a second threshold amount of power via the engine when the vehicle is operating in the stationary electrical power generating mode and when the particulate filter is not being regenerated, the second threshold amount of power greater than the first threshold amount of power.

Referring now to FIG. 5, a plan view of a transmission shifter 245 is shown. Shift level 247 may be moved to one of a plurality of positions P (park), R (reverse), N (neutral), or D (drive) to change the operating state of the transmission. Shift lever 247 may move longitudinally in slot 502 to the park position 504, the reverse position 506, the neutral position 508, or the drive position 510 via the vehicle's human driver. The transmission shifter 245 indicates the human driver's intent to park the vehicle, drive the vehicle in a forward direction, or drive the vehicle in a reverse direction. Shift lever 247 may be prevented from moving out of park by the human driver when the human driver has requested that the vehicle operate in a stationary electrical power generating mode.

As will be appreciated by one of ordinary skill in the art, methods described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, 13, 14, 15, V6, V8, V10, and V12 engines operating in natural gas, gasoline, diesel, or alternative fuel configurations could use the present description to advantage.

The invention claimed is:

1. A method of operating a vehicle, comprising:
regenerating a particulate filter including operating an engine with a lean air-fuel ratio and retarded spark timing via a controller when a transmission shifter is locked in a park position, the transmission shifter locked in the park position when the vehicle is operating in a stationary electrical power generating mode, and
operating the engine with a stoichiometric air-fuel ratio when the particulate filter is not being regenerated when the vehicle is operating in the stationary electrical power generating mode.

2. The method of claim 1, where the transmission shifter is prevented from moving from a park position to a drive position or a reverse position unless a human driver overrides operation of a shift locking device, and where the shift locking device automatically engages to prevent the transmission shifter from exiting park in response to the vehicle operating in the stationary electrical power generating mode.

3. The method of claim 1, further comprising delivering electrical power from an electric machine onboard the vehicle to an electrical energy consumer off-board the vehicle when the vehicle is operating in the stationary electrical generating mode.

4. The method of claim 3, where the electric machine is coupled to the engine.

5. The method of claim 3, further comprising operating the vehicle in the stationary electrical power generating mode.

6. The method of claim 1, further comprising operating the engine in a first cylinder mode in response to the vehicle operating in the stationary electrical power generating mode while regenerating the particulate filter.

7. The method of claim 6, further comprising operating the engine in a second cylinder mode in response to the vehicle operating in the stationary electrical power generating mode while not regenerating the particulate filter, where the second cylinder mode is different than the first cylinder mode.

8. A method of operating a vehicle, comprising:
regenerating a particulate filter including operating an engine with a lean air-fuel ratio and retarded spark timing via a controller when a transmission shifter is locked in a park position, the transmission shifter locked in the park position when the vehicle is operating in a stationary electrical power generating mode; and
not adjusting engine torque in response to accelerator pedal position when the vehicle is operating in the stationary electrical power generating mode.

9. The method of claim 8, further comprising adjusting engine torque in response to accelerator pedal position when the vehicle is not operating in the stationary electrical power generating mode.

10. The method of claim 9, where an electric machine coupled to the engine provides electric power to electric consumers off-board the vehicle when the vehicle is operating in the stationary electrical power generating mode.

11. The method of claim 8, further comprising providing not more than a first threshold amount of power via the engine when the vehicle is operating in the stationary electrical power generating mode and when the particulate filter is being regenerating.

12. The method of claim 11, further comprising providing not more than a second threshold amount of power via the engine when the vehicle is operating in the stationary electrical power generating mode and when the particulate filter is not being regenerated, the second threshold amount of power greater than the first threshold amount of power.

13. A vehicle system, comprising:
an engine;
an electric machine coupled to the engine; and
a controller including executable instructions stored in non-transitory memory to log date and time data to controller memory that indicates when a vehicle is operating in a stationary electrical power generating mode where the engine is operated while the vehicle is stationary to generate electrical power via the electric machine for one or more off-board electric power consumers, log date and time data to controller memory that indicates when the vehicle is operating in a mode other than the stationary electrical power generating mode, and regenerate a particulate filter including operating the engine with a lean air-fuel ratio when the vehicle is expected to operate in the stationary electrical power generating mode for a predetermined amount of time based on the date and time data logged to controller memory that indicates when the vehicle is operating in the stationary electrical power generating mode.

14. The vehicle system of claim 13, further comprising additional instructions to not adjust engine torque in response to accelerator pedal position when the vehicle is operating in the stationary electrical power generating mode.

15. The vehicle system of claim 13, further comprising additional instructions to lock a transmission shifter in a park position when the vehicle is operating in the stationary electrical power generating mode.

16. The vehicle system of claim 13, further comprising additional instructions to operate the engine with a stoichiometric air-fuel ratio when the particulate filter is not being regenerated when the vehicle is operating in the stationary electrical power generating mode.

17. The vehicle system of claim 13, further comprising additional instructions to operate the engine in a first cylinder mode in response to the vehicle operating in the stationary electrical power generating mode while regenerating the particulate filter, where operating the engine in the first cylinder mode includes operating the engine with a first number of cylinders deactivated.

18. The vehicle system of claim 17, further comprising additional instructions to operate the engine in a second cylinder mode in response to the vehicle operating in the stationary electrical power generating mode while not regenerating the particulate filter, where operating the engine in the second cylinder mode includes operating the engine with a second number of cylinders deactivated, different than the first number of cylinders.

19. The vehicle system of claim 14, further comprising additional instructions to retard engine spark timing in response to operating the vehicle in the stationary electrical power generating mode.

\* \* \* \* \*